United States Patent [19]

Shimizu

[11] Patent Number: 4,789,231
[45] Date of Patent: Dec. 6, 1988

[54] ARRANGEMENT FOR CORRECTING BALLISTIC TRAJECTORY IN RIFLESCOPE

[75] Inventor: Fumio Shimizu, Nagano, Japan

[73] Assignee: Kabushiki Kaisha Light Kohki Seisakusho, Nagano, Japan

[21] Appl. No.: 139,260

[22] Filed: Dec. 29, 1987

[30] Foreign Application Priority Data

Dec. 29, 1986 [JP] Japan .................. 61-200210[U]

[51] Int. Cl.⁴ .................. G02B 7/10; G02B 27/32; G02B 23/00
[52] U.S. Cl. .................. 350/560; 350/562; 350/565
[58] Field of Search .............. 350/560, 561, 562, 563, 350/565, 566, 567, 570, 572; 356/247

[56] References Cited

U.S. PATENT DOCUMENTS

| | | | |
|---|---|---|---|
| 2,155,389 | 4/1939 | Arden | 356/247 |
| 3,492,733 | 2/1970 | Leatherwood | 350/560 |
| 3,506,330 | 4/1970 | Allen | 350/560 |
| 4,255,013 | 3/1981 | Allen | 350/560 |

Primary Examiner—Jon W. Henry
Attorney, Agent, or Firm—Wenderoth, Lind & Ponack

[57] ABSTRACT

A riflescope including means for correcting the ballistic trajectory corresponding to the bullets being used. A magnification alteration ring drives a zoom lens system by a rotatable cam cylinder. An axially slidable cam member is coaxially rotatably mounted on the cam cylinder and in cammed engagement with said magnification alteration ring for effecting axial sliding thereof in accordance with the rotation of the magnification alteration ring, and the cam member is prevented from rotating during axial sliding thereof. The cam member has a plurality of sloped surfaces on the outer face thereof extending in a direction parallel to the axis of the cam member, one sloped surface for each different type of bullet to be used, and the sloped surfaces being adjacent the free end of the lens tube holding the zoom lens system. A changeover ring is rotatably mounted on the outside of the riflescope tube for stepwise rotation therearound and engaged with the cam member for effecting stepwise rotation of the cam member. A finely adjustable stopper member on the riflescope tube is engaged with the respective sloped surfaces as the cam member is rotated, and a resilient member is engaged with and biases the free end of the lens tube against the stopper member. Each of the sloped surfaces has a shape for minutely axially tilting the lens tube, and thus the line of sight of the riflescope, for correcting the virtual ballistic trajectory for the type of bullet corresponding to the respective sloped surface in accordance with the position of the zoom lens system.

1 Claim, 2 Drawing Sheets

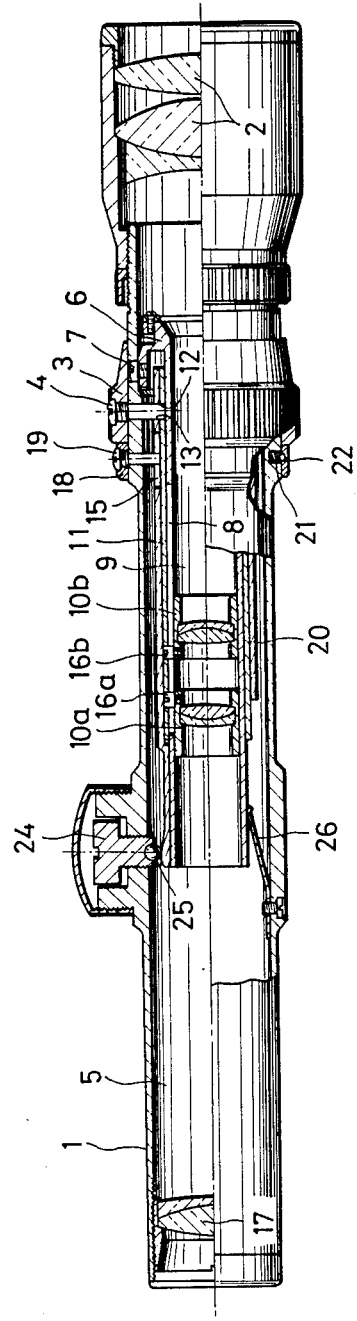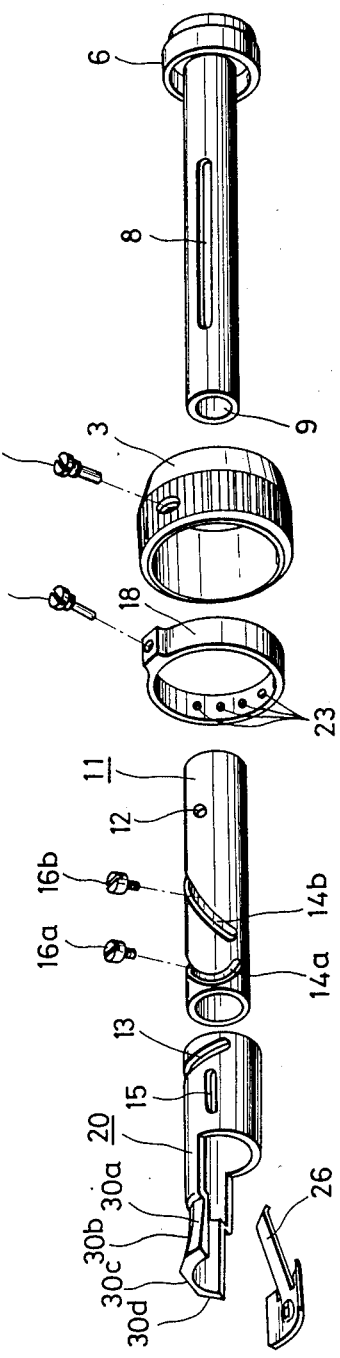

ARRANGEMENT FOR CORRECTING BALLISTIC TRAJECTORY IN RIFLESCOPE

BACKGROUND OF THE INVENTION

1. Field of the Invention

The present invention relates to arrangement in a riflescope for correcting the ballistic trajectory and, in particular, to an arrangement in which turning of a magnification alteration ring will cause an alteration of the image size of the target, on the one hand, and, at the same time, will effect a shift of the target image within the viewing field including a reticle and scales for the sight in the vertical direction under minute axial tilting adjustment of the erecting lens tube for achieving a virtually corrected line of the sight, on the other hand, whereby adjustment of target aiming is effected automatically with instantaneous indication of the hit point, said riflescope permitting rapid response to every change in the type of bullet used in the rifle by means of a changeover ring incorporated in the arrangement.

2. Description of the Prior Art

Generally, the purpose of a riflescope is to provide for easy aiming with a rifle at distant game, such as a bird or an animal (referred to as the target in the following), by making use of an enlarged view of the target to make visual identification thereof easier.

In aiming at a target using a riflescope, an adjustment of the sight in the vertical as well as in lateral directions, on the one hand, and an in situ correction of the ballistic trajectory, on the other hand, are necessary for hitting the target properly. Since ballistic trajectories of rifle bullets are different depending on the specific distance between the gun and the target (see FIG. 4). In conventional riflescopes, the after-correction of the ballistic trajectory is effected by the shooter by manipulating an adjustment dial arranged on the upper face of the scope tube to adjust it to the scale corresponding to each specific distance to the target which the shooter has estimated beforehand with the aid of the magnification of the target image, so as to shift the sight correspondingly in the vertical direction.

As stated above, conventional arrangements require, after an estimation of the distance has been effected, an after-correction operation for the adjustment dial, so that a time-consuming, annoying two-step operation due to the distance estimation and the dial manipulation is unavoidable. This is a very significant disadvantage for a rifle shot that requires a most prompt correction of the ballistic trajectory.

For solving such a problem, the inventor previously made a proposal in Japanese Utility Model Application Sho 61-173977 for a fully automatic device for correcting the ballistic trajectory. This prior proposal deals, however, with a correction mechanism effective for only one specific type of bullet and is not applicable at all, or is hardly applicable, to different rifles with difference types of bullets.

In relation to the correction of the ballistic trajectory of a gun for various types of bullets (bullets of several sizes, shapes, amounts of gunpowder in the cartridge and so on can be used in the same rifle), various measures may be taken, for example, to exchange the dial for another one having different scale, to neglect the differences in ballistic trajectory for different bullets, to limit the type of bullet to be employed to a one single type, etc.

The present invention attempts to overcome the difficulties in such measures as described above, such as inaccuracy in the sight, inconveniences in operation and so on, and to make possible to attain a simple and easy correction of the ballistic trajectory for various types of bullets by the hands of the shooter, so as to widen the range of utilization of the riflescope.

BRIEF SUMMARY OF THE INVENTION

The object of the present invention is thus to provide an arrangement for correcting the ballistic trajectory in a riflescope which enables an automatic correction of the ballistic trajectory by only a single operation of aiming at the target, and which permits a rapid response to a change in the type of bullet with correspondingly different ballistic trajectory merely by changing the position of a changeover ring.

DETAILED DESCRIPTION OF THE INVENTION

The arrangement for correcting the ballistic trajectory according to the invention, in which the lens frames for the zoom lens system in the erecting lens tube in the riflescope tube are arranged axially slidable so as to be able to move toward or away from each other to alter the magnification of the riflescope by turning manipulation of a magnification alteration ring, comprises a rotatable cam cylinder on or in said erecting lens tube and rotated in accordance with the rotation of the magnification alteration ring and effecting axial sliding of the lens frames of the zoom lens system, an axially slidable cam member which is fitted on the cam cylinder and provided with a cam groove shaped for effecting the axial sliding thereof in accordance with the rotation of the magnification alteration ring, a means for preventing rotation of the cam member during its axial sliding, and a plurality of axially inclined sloped surfaces disposed on the outer face of the cam member corresponding in number to the number of changeovers to accommodate the different types of bullet employed; a changeover ring on the outer face of the riflescope tube for effecting, by stepwise rotation of said cam member, changeover of the mode of the sight for each particular bullet used; and a resilient member biasing the free end of the erecting lens tube to press a stopper member finely adjustably movable inside the riflescope tube, each of said axial sloped surfaces being shaped for causing, in association with said stopper member, minute axial the sight, in order to provide the virtual ballistic trajectory corrected for each specific type of bullet used.

BRIEF DESCRIPTION OF THE DRAWINGS

FIG. 1 is a partial axial section of one embodiment of the riflescope according to the present invention;

FIG. 2 is an exploded perspective view of the principal members of the trajectory correcting arrangement of the riflescope of FIG. 1;

DETAILED DESCRIPTION OF A PREFERRED EMBODIMENT

Figure 3:
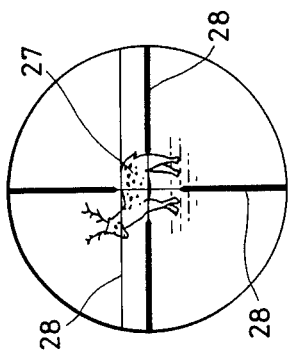
FIG. 3 is an illustration of an example of the view field of a riflescope.

In the embodiment of the riflescope shown in FIGS. 1 and 2, the tube 1 of riflescope is provided at a portion near the ocular 2 with a magnification alteration ring 3 and with a changeover ring 18 for changing over the ballistic trajectory. On turning the magnification alteration ring 3, a connection member, such as a threaded bolt 4 fixed firmly on the ring 3 is caused to rotate together with it, for rotating a cam cylinder 11 axially and slidably rotatable on the erecting lens tube 6 and held in engagement with the connection member 4.

The changeover ring 18 is also furnished on its inner surface with an engagement member 19, such as a threaded bolt, for engaging the ring 18 with a cam member 20 used for achieving axial tilting adjustment of the erecting lens tube 6.

The erecting lens tube 6 is arranged within the interior 5 of the scope tube 1. The basal end of the erecting lens tube 6 facing the ocular 2 is fixed to the riflescope tube 1 by a fixing screw 7, so that the erecting lens tube will not slide or rotate relative to the riflescope 1. The front end is freely laterally displaceable. It is also possible, however, to fix the front end of the erecting lens tube 6 and allow the rear end to be displaceable.

The erecting lens tube 6 has a longitudinal groove or long hole 8 parallel to the optical axis and accommodates within its interior 9 two lens frames 10a and 10b slidable in the axial direction relative to each other for effecting a zooming of the scope.

The erecting lens tube 6 is slidably mounted in the cam cylinder 11 described above. Here however, it is of course possible, if necessary, to have the cam cylinder 11 slidably mounted on the erecting lens tube 6. The cam cylinder 11 is provided with a receptacle hole 12, into which the end of the connection member 4 is inserted, and with a pair of cam grooves 14a and 14b which are shaped to effect zooming by sliding the two frames 10a and 10b relative to each other, the frames having respective drive pins 16a and 16b, e.g. in a form of a threaded bolt thereon, and which are engaged in the grooves 14a and 14b and the groove 8 to slide therein so as to effect zooming of the riflescope.

The lower end of the connection member 4 on the magnification alteration ring 3 extends through an oblique cam groove 13 provided in the cam member 20 for trajectory correction and then into the receptacle hole 12 in the cam cylinder 11 to establish a solid engagement with the cam cylinder 11.

Cam member 20 is slidably mounted on the cam cylinder 11 and is provided with a straight guide groove 15 parallel to the optical axis which receives therein the engagement member 19. The changeover ring 18 has on its inner surface click stop indentations 23 each disposed at a position corresponding to one of axially extending slope surfaces 30a-30d provided on the cam member 20. On the inner face of the riflescope tube 1 at a position corresponding to the click stop indentation 23 is provided a steel ball 22 held in a receptacle recess in the tube 1 and biased inwardly by a spring 21, so that the changeover ring 18 cannot be freely turned unless a force of rotation higher than a definite value is imparted thereto, in order to prevent any unintentional changeover of the trajectory.

The axial sloped surfaces 30a-30d provided on the cam member 20 are provided for establishing an accurate ballistic trajectory for each specific range for each particular type of bullet type and are each formed in accordance with a preliminary calculation. A stopper ball 25 in the form of a ball bearing is provided on the end of a finely adjustable screw 24 and is held in abutting relation with the selected one of the sloped surfaces 30a-30d. During trial and error testing, the screw 24 is turned to adjust the position of the ball 25 for the correct ballistic trajectory for the bullets used. A resilient member in the form of, for example, a plate spring 26, is provided on the inner surface of the scope tube 1 at a position nearly diametrically opposed to the ball 25 in order to impart to the erecting lens tube 6 at its free end a biasing force pressing it against the stopper ball 25.

The user of the riflescope can voluntarily select the trajectory corresponding to the type of bullet used by rotating the changeover ring 18 to a setting corresponding to the type of bullet, and the ring will be held in the desired rotated position by a snap-in engagement of the stop ball 22 with the click stop indentation 23. During this rotation of the changeover ring 18, the cam member 20 is also moved in the axial direction by the cam engagement of the cam groove 13 with the connection pin 4 sliding along this cam groove 13.

In use, the user will view the target 27 through the riflescope, and rotate the magnification alteration ring until the target 27 is positioned within the target guide indicators 28 in the ocular, as shown in FIG. 3.

Figure 4:
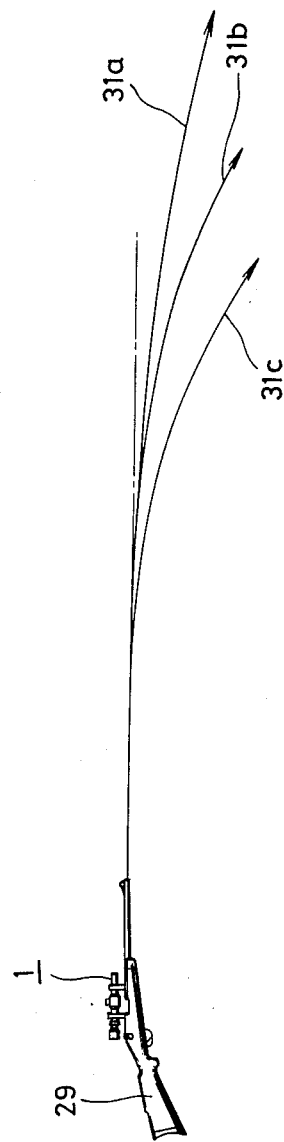
FIG. 4 is a diagram of ballistic trajectories for different types of bullets.

In this manner, rotation of the magnification alteration ring 3 will effect not only zooming of the riflescope 1 by the cam engagement of the drive pins 16a and 16b with the cam grooves 14a and 14b in the cam cylinder 11, but will also effect a simultaneous correction of the ballistic trajectory, for example from 31a to 31b or 31c, as shown in FIG. 4, by the axial sliding of the abutting point of the stopper ball 25 upon the respective sloped surface 30 on the cam member 20 by the cam engagement of the connection pin 4 on the changeover ring 3 with the cam groove 13 of the cam member 20 which is rotated together with the changeover ring 3 by the connection pin 4. The axial sliding of the abutting point of the stopper ball 25 on the respective one of the sloped surfaces 30a-30d causes a corresponding axial tilting of the erecting lens tube 6 around the point of fixation of the erecting lens tube by the fixing screw 7 as a fulcrum to effect fine adjustment of the trajectory. Thus, by selecting the respective rotational set position for the specific type of bullet used, the stopper ball 25, the position of which has been finely adjusted for the correct ballistic trajectory by trial and error testing and manipulating the adjustment screw 24, will abut the respective sloped surface corresponding to the bullet used at the correct point for the designated trajectory.

The configuration or inclination of the respective sloped surfaces 30a-30d in the axial direction of the riflescope is so chosen that the correction value for the ballistic trajectory for the bullet corresponding to a particular sloped surface will correspond to the preliminary calculated value of the trajectories for the distances from the rifle to the target in relation to the slide stroke of the zoom lens frames. Thus, a requisite correction of the trajectory can be effected along with a zooming of the scope simply by a one-touch changeover of the changeover ring 18.

As described above, the riflescope according to the invention makes it possible to attain an automatic and accurate correction of the ballistic trajectory simply by rotational manipulation of the magnification alteration ring 3 for determining the distance from the rifle to the target, and thus, quick shots can be made, so that the invention offers a very distinct advantage over the prior art.

What is claimed is:

1. A riflescope including means for correcting the ballistic trajectory corresponding to the bullets being used, comprising:

a riflescope tube;

an erecting lens tube having one end fixedly mounted in said riflescope tube and the other end free;

lens frames for a zoom lens system axially slidably mounted in said riflescope tube for movement toward and away from each other for altering the magnification of the riflescope;

a magnification alteration ring rotatably mounted for rotation around said riflescope tube;

a rotatable cam cylinder rotatable coaxially with said erecting lens tube and engaged by said magnification alteration ring for being rotated in accordance with the rotation of said magnification alteration ring and in cam engagement with said lens frames for effecting said axial sliding of said lens frames;

an axially slidable cam member coaxially rotatably mounted on said cam cylinder and in cammed engagement with said magnification alteration ring for effecting axial sliding thereof in accordance with the rotation of said magnification alteration ring;

means engaged with said cam member for preventing rotation of said cam member during axial sliding thereof;

said cam member having a plurality of sloped surfaces on the outer face thereof extending in a direction parallel to the axis of said cam member, one sloped surface for each different type of bullet to be used, and said sloped surfaces being adjacent the free end of said lens tube;

a changeover ring rotatably mounted on the outside of said riflescope tube for stepwise rotation therearound and engaged with said cam member for effecting stepwise rotation of said cam member;

a finely adjustable stopper member on said riflescope tube and engaged with the respective sloped surfaces as said cam member is rotated; and a resilient member engaged with and biasing the free end of said lens tube against said stopper member;

each of said sloped surfaces having a shape for minutely axially tilting said lens tube, and thus the line of sight of said riflescope, for correcting the virtual ballistic trajectory for the type of bullet corresponding to the respective sloped surface in accordance with the position of said lens frames in the zoom lens system.

* * * * *